E. R. STOEKLE.
REGULATOR FOR ALTERNATING CURRENTS.
APPLICATION FILED NOV. 24, 1917.
1,376,978.
Patented May 3, 1921.
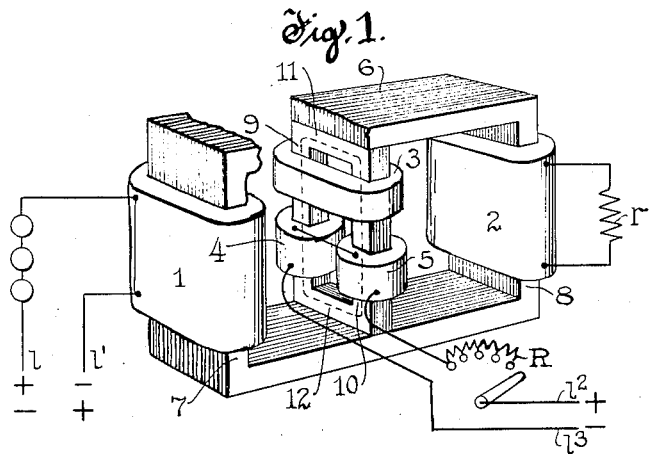
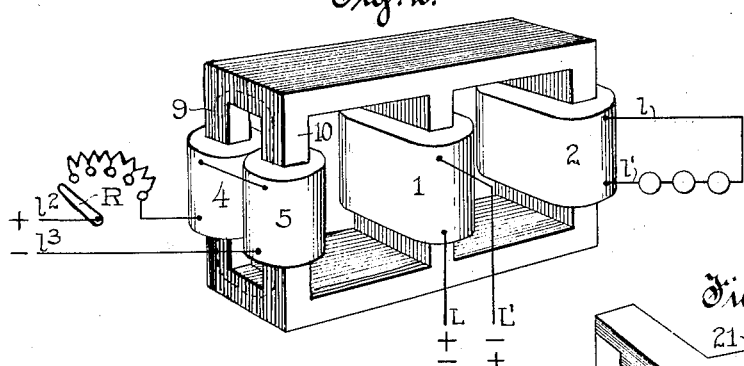
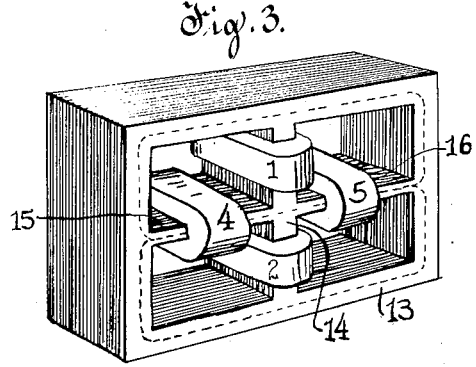
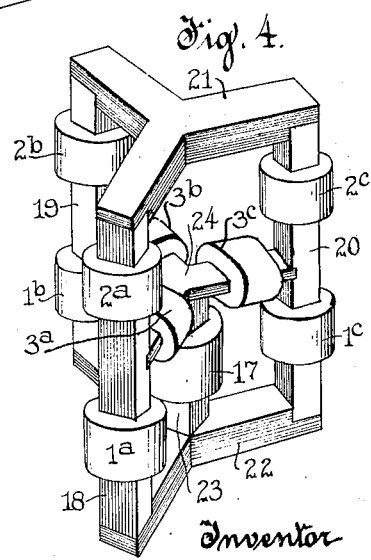
Inventor
Erwin R. Stoekle
By Frank A. Hubbard
Attorney

UNITED STATES PATENT OFFICE.

ERWIN R. STOEKLE, OF MILWAUKEE, WISCONSIN, ASSIGNOR TO THE CUTLER-HAMMER MFG. CO., OF MILWAUKEE, WISCONSIN, A CORPORATION OF WISCONSIN.

REGULATOR FOR ALTERNATING CURRENTS.

1,376,978.                Specification of Letters Patent.        Patented May 3, 1921.

Application filed November 24, 1917. Serial No. 203,661.

*To all whom it may concern:*

Be it known that I, ERWIN R. STOEKLE, a citizen of the United States, residing at Milwaukee, in the county of Milwaukee and State of Wisconsin, have invented new and useful Improvements in Regulators for Alternating Currents, of which the following is a full, clear, concise, and exact description, reference being had to the accompanying drawing, forming a part of this specification.

This invention relates to means for regulating alternating current circuits.

More particularly the invention relates to that class of electromagnetic regulators designed to curtail the required number of switches and other moving parts and to provide for regulation through a wide range in response to relatively small variations of current in a control circuit.

According to the present invention it is proposed to include in the controlled circuit a coil of a transformer; to provide a magnetic shunt for the transformer and to vary the permeability of such magnetic shunt, by independent magnetization thereof, for variation of the mutual inductance of the transformer coils. Preferably the primary coil of the transformer is included in the controlled circuit to provide an impedance therefor variable by variation of the permeability of the magnetic shunt but the invention also contemplates alternative use of the transformer to supply current to the controlled circuit and regulation of the transformer action by variation of the permeability of the magnetic shunt. Also, according to the present invention, it is proposed to so arrange the exciting means for the transformer shunt as to render negligible the induced electromotive forces in said means due to the magnetic fluxes of the transformer coils.

Regulators embodying the invention may also assume various different forms, certain of which are illustrated in the accompanying drawing now to be described.

In the drawing,

Figure 1 shows in perspective a regulator for single phase circuits and one particularly designed for use of the primary coil as an impedance for the controlled circuit, a portion of the frame being broken away to more fully disclose the windings on the magnetic shunt.

Fig. 2 shows in perspective a modified form of regulator for single phase circuits and discloses the use thereof for supplying current to the controlled circuit.

Fig. 3 shows in perspective another modification of the regulator suitable for single phase circuits; and, Fig. 4 shows in perspective a regulator suitable for three phase circuits.

Referring to the regulator shown in Fig. 1, the same comprises a primary transformer coil 1, secondary transformer coils 2 and 3 and exciting coils 4 and 5. These coils are mounted upon a unitary magnetic frame 6 formed of laminations. The frame 6 has parallel end members 7 and 8 forming cores for the coils 1 and 2 respectively and intermediate members 9 and 10 forming cores for the exciting coils 4 and 5 respectively and jointly forming a core for the coil 3. The cores 9 and 10 are arranged in a symmetrical relation with respect to the cores 7 and 8 and provide like magnetic shunts for the fluxes threading the primary and secondary coils 1 and 2. Also, the cores 9 and 10 are connected at their extremities by cross members 11 and 12 to provide a closed magnetic circuit for the exciting coils external to the common magnetic circuit of the primary and secondary coils 1 and 2.

The primary coil 1 is connected in the controlled circuit $l$, $l'$, while the secondary coil 2 is connected in a closed loop including a resistance $r$, the secondary coil 3 being short-circuited. On the other hand, the coils 4 and 5 are independently excited as from a direct current source $l^2$, $l^3$, said coils being connected in series and variable in the degree of excitation thereof as by a rheostat R. Further, the coils 4 and 5 are arranged to have opposite polarities whereby they produce magnetic fluxes traversing the cores 9 and 10 in opposite directions. Thus the magnetic flux induced by the exciting coils will traverse the path indicated by dotted lines and hence be confined to the local magnetic circuit provided by the cores 9 and 10 and their connecting members. Also, since the shunt magnetic flux induced by the transformer coils threads the exciting coils in the same direction the arrangement of the latter coils for opposed D. C. polarities will insure opposition of the A. C. electromotive forces induced therein and consequently a negligible resultant of such forces.

Thus assuming zero excitation of the coils 4 and 5 and consequent maximum permeability of the shunt cores 9 and 10 a portion of the A. C. flux induced by the primary coil will be shunted to thread the secondary coil 3. And this shunted flux will excite coil 3, causing the same to induce a flux tending to demagnetize the core 7 of the coil 1 and hence decreasing the impedance value of the latter coil. On the other hand, assuming excitation of the coils 4 and 5, the magnetic flux induced thereby will reduce the permeability of the cores 9 and 10 thereby reducing the amount of A. C. flux shunted through said cores, or in other words, forcing more of the flux induced by the primary winding to thread the coil 2, the induced current of which must traverse the resistance $r$. This accordingly reduces the demagnetizing effect of the secondary coils 2 and 3, jointly considered, and thereby causes an increase in the impedance value of the primary coil. Thus by varying the degree of excitation of the coils 4 and 5, the demagnetizing effect of the secondary coils 2 and 3 may be varied to correspondingly regulate the impedance value of the coil 1.

Fig. 2 shows a structure differing from that shown in Fig. 1 only in the omission of the secondary coil 3 and the shifting of the cores 9 and 10 from a position between the transformer coils to a position on the opposite side of the primary coil. Accordingly should the secondary coil 3 be added to this structure the latter might be used in the same way as shown in Fig. 1, while on the other hand, it will be apparent that removal of the coil 3 from the structure shown in Fig. 1 would enable use of the device in a way now to be described.

In this instance the primary coil 1 is connected to an A. C. supply circuit L, L′, while the secondary coil 2 is utilized to supply current to the controlled circuit $l$, $l'$, the exciting coils 4 and 5 being connected to a D. C. circuit $l^2$, $l^3$ through a rheostat R, as in Fig. 1. Thus assuming zero excitation of the coils 4 and 5, a given portion of the induced A. C. flux will be shunted from the common magnetic circuit of the coils 1 and 2, with the result of curtailing the excitation of the secondary coil 2 and hence the current supplied to the controlled circuit. On the other hand, excitation of the coils 4 and 5, with a consequent decrease in the permeability of the shunt cores 9 and 10, will curtail the amount of shunted flux, or in other words, force more of the primary flux to thread the secondary coil with the result of increasing the E. M. F. induced in the latter coil and the current supplied to the controlled circuit.

Fig. 3 shows a shell type of transformer regulator having similar primary and secondary coils 1 and 2 respectively and exciting coils 4 and 5. In this instance, however, a magnetic frame 13 is provided having a common core 14 for the primary and secondary coils and cores 15 and 16 for the exciting coils extending in opposite directions from the core 14 and positioned between the coils 1 and 2. The cores 15 and 16 thus provide magnetic shunts for the induced A. C. flux and as will be apparent, such flux traverses the cores in opposite directions. Accordingly by arranging the exciting coils 4 and 5 for like D. C. polarities thereof instead of opposed D. C. polarities, as in the regulators previously described, the A. C. electromotive forces induced therein will be mutually opposed and therefore give a negligible resultant. The D. C. flux will then traverse both the cores 15 and 16 and the frame 13 as indicated by dotted lines, but, due to the relatively greater cross sectional area of the frame, the effect of such D. C. flux on the transformer coils will be negligible. Thus the regulator will function in the same manner as the regulator shown in Fig. 2.

Fig. 4 shows a regulator having three primary coils $1^a$, $1^b$, $1^c$, three secondary coils $2^a$, $2^b$, $2^c$ and a single exciting coil 17. The primary and secondary coils $1^a$, $2^a$ are mounted upon a common core 18, while the remaining primary and secondary coils are correspondingly mounted on common cores 19 and 20, said cores being secured to and connected by Y-shaped magnetic end members 21 and 22 for symmetrical distribution thereof about a core 23. The core 23 has mounted thereon the exciting coil 17 and is supported by and between the end member 22 and a Y-shaped magnetic member 24 fixed to the cores 18, 19 and 20 at points between the primary and secondary coils. Also, as shown, short-circuited coils $3^a$, $3^b$ and $3^c$ may be mounted upon the member 24, but it is to be understood that these coils may be omitted.

The member 24 forms a magnetic shunt for each pair of transformer coils through the core of the exciting coil and assuming equal phase displacement of the magnetic fluxes induced by the three sets of transformer coils, the resultant of these fluxes in the core 23 of the exciting coil will be negligible. On the other hand, since the fluxes shunted from all sets of the transformer coils traverse the core 23, the exciting coil 17, by varying the permeability of said core, provides for regulation of the mutual inductance of the primary and secondary coils. And although in this instance the flux of the exciting coils threads the primary transformer coils, the cores 18, 19 and 20 are of such relatively greater cross sectional area than the corresponding arms of member 24 as to render the effect of the D. C. flux upon said cores negligible.

Thus the regulator, exclusive of the coils 3ª, 3ᵇ and 3ᶜ may be used with the primary coils connected in different phases of a three phase supply circuit and its secondary coils connected in different phases of a three phase controlled circuit, to regulate the latter circuit in the manner described in connection with Fig. 2. Or the regulator, inclusive of the coils 3ª, 3ᵇ and 3ᶜ may be used with its primary coils connected in different phases of a three phase controlled circuit and its secondary coils 2ª, 2ᵇ and 2ᶜ each connected across a resistance, to regulate the controlled circuit in the manner described in connection with Fig. 1.

In the regulators illustrated in Figs. 1 to 3 inclusive the exciting coils may, if desired, be wound in a number of sections, each section on one core being connected in series with a section on the other core, thereby curtailing the voltage induced in the individual exciting coils. Also, various other modifications may be made in the structures illustrated without departing from the invention as defined in the appended claims.

What I claim as new and desire to secure by Letters Patent is:

1. In a regulator for alternating current circuits, in combination, a transformer having a plurality of cores forming magnetic shunts, of a plurality of exciting coils each arranged on one of said cores to independently magnetize the same and thereby vary the permeability thereof for a change in the mutual inductance of the coils of said transformer, said exciting coils having relative polarities insuring a negligible resultant alternating current therein.

2. In a regulator for alternating current circuits, in combination, a transformer having a plurality of cores forming magnetic shunts therefor, said cores being connected to provide a local magnetic circuit, of exciting coils mounted on said cores and having opposed polarities whereby their magnetic fluxes traverse said local magnetic circuit and whereby said exciting coils insure a negligible resultant alternating current therein, said exciting coils when energized serving to reduce the permeability of said cores to vary the mutual inductance of the coils of said transformer.

3. In a regulator for alternating current circuits, in combination, a transformer having a primary coil, a secondary coil connected across a resistance and a magnetic frame for said coils providing a magnetic shunt, of electromagnetic means to independently magnetize a portion of said frame for control of the number of magnetic lines of force induced by said transformer coils which traverse said shunt and consequent variation of the impedance value of said primary coil.

4. In a regulator for alternating current circuits, in combination, a transformer having a primary coil, a plurality of secondary coils having separate closed circuits of a given relative resistance value and a magnetic frame provided with cores for all of said coils, of electromagnetic means for independently magnetizing a portion of said frame to vary the relative number of lines of force induced by said coils which traverse the cores of said secondary coils.

5. In a regulator for alternating current circuits, in combination, a transformer having a primary coil, a plurality of secondary coils having separate closed circuits of a given relative resistance value and a magnetic frame provided with cores for all of said coils, of electromagnetic means for independently magnetizing a portion of said frame to vary the relative number of lines of force induced by said coils which traverse the cores of said secondary coils, said electromagnetic means being arranged to insure a negligible alternating current therein.

6. In combination, an alternating current circuit, a transformer having its primary winding included in said circuit to provide an impedance therefor, a magnetic shunt for the coils of said transformer and means to effect variation of the number of magnetic lines of force induced by said coils which traverse said magnetic shunt, to thereby vary the impedance value of said primary coil.

7. The combination with an alternating current circuit, a transformer having its primary coil included in said circuit to provide an impedance therefor, a closed secondary circuit for said transformer including a resistance, a magnetic shunt for the coils of said transformer and means to independently magnetize a part of the magnetic circuit of said coils to vary the number of magnetic lines of force induced thereby which traverse said magnetic shunt.

8. In combination, an alternating current circuit, an inductive coil included therein to provide an impedance therefor, a plurality of coils arranged in an inductive relation therewith and having independent closed circuits bearing a definite relation of resistance values and means for varying the permeability of a magnetic core of the latter coils for variation of the mutual inductance of the primary and secondary coils and consequent variation of the impedance value of said primary coil.

In witness whereof, I have hereunto subscribed my name.

ERWIN R. STOEKLE.